(12) United States Patent
Zhidkov et al.

(10) Patent No.: US 7,715,496 B2
(45) Date of Patent: May 11, 2010

(54) CHANNEL STATE DETERMINATION METHOD AND CHANNEL STATE GENERATOR IN RECEIVER

(75) Inventors: Sergey Zhidkov, Suwon-si (KR); Hyun-Bae Jeon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1472 days.

(21) Appl. No.: 11/017,706

(22) Filed: Dec. 22, 2004

(65) Prior Publication Data

US 2005/0254598 A1  Nov. 17, 2005

(30) Foreign Application Priority Data

May 14, 2004  (KR)  ...................... 10-2004-0034268

(51) Int. Cl.
*H04L 27/06* (2006.01)
(52) U.S. Cl. .................. 375/316; 375/346; 375/285; 375/147; 375/148
(58) Field of Classification Search ................ 375/316, 375/346, 285, 147, 148
See application file for complete search history.

(56) References Cited

U.S. PATENT DOCUMENTS

| 6,205,188 | B1 |   | 3/2001 | Stott et al. |  |
|---|---|---|---|---|---|
| 6,690,739 | B1 | * | 2/2004 | Mui | 375/265 |
| 6,904,098 | B1 | * | 6/2005 | Isaksen et al. | 375/261 |
| 7,106,810 | B2 | * | 9/2006 | Collins et al. | 375/316 |
| 7,180,892 | B1 | * | 2/2007 | Tackin | 370/389 |
| 7,218,673 | B2 | * | 5/2007 | Chang et al. | 375/233 |
| 7,224,726 | B2 | * | 5/2007 | Perlow et al. | 375/233 |
| 7,430,256 | B2 | * | 9/2008 | Zhidkov | 375/346 |
| 2003/0001974 | A1 |   | 1/2003 | DSouza |  |
| 2003/0231709 | A1 | * | 12/2003 | Pare et al. | 375/233 |
| 2004/0037262 | A1 | * | 2/2004 | Tanada | 370/342 |
| 2004/0218519 | A1 | * | 11/2004 | Chiou et al. | 370/203 |
| 2005/0129148 | A1 | * | 6/2005 | Isaksen et al. | 375/326 |
| 2005/0141644 | A1 | * | 6/2005 | Sadowsky | 375/324 |
| 2008/0098287 | A1 | * | 4/2008 | Kolze et al. | 714/795 |

FOREIGN PATENT DOCUMENTS

| EP | 0991239 A2 | 4/2000 |
|---|---|---|
| EP | 1035692 A2 | 9/2000 |

(Continued)

OTHER PUBLICATIONS

Korean Search Report dated Dec. 14, 2005 for Korean patent application No. 10-2004-0034268.
Office Action from the National Institute of Industrial Property in France, dated Mar. 20, 2008, for the corresponding French patent application (4 pp.).

(Continued)

*Primary Examiner*—Chieh M Fan
*Assistant Examiner*—Siu M Lee
(74) *Attorney, Agent, or Firm*—Harness, Dickey & Pierce, P.L.C.

(57) ABSTRACT

Exemplary embodiments of the present invention provide a receiver, a generator, an error-averager, and a determiner and methods for the same. In exemplary embodiments of the present invention, cyclical characteristics of a signal may be used to obtain an improved signal-to-noise ratio (SNR). Exemplary embodiments of the generator may generate a signal output from an equalizer and may transmit the signal to a decoder, which may calculate a metric. The signal may be proportional to the reliability of a symbol.

12 Claims, 8 Drawing Sheets

FOREIGN PATENT DOCUMENTS

| | | |
|---|---|---|
| EP | 1221793 A2 * | 7/2002 |
| KR | 10-1998-0036581 | 4/2000 |
| KR | 10-2002-7017560 | 12/2002 |
| KR | 2003-0013461 A | 2/2003 |
| WO | 02/087180 | 10/2002 |

OTHER PUBLICATIONS

V. Mignone et al., "CD3-OFDM: A New Channel Estimation Method to Improve the Spectrum Efficiency in Digital Terrestrial Television Systems", International Broadcasting Convention, Sep. 14, 1995, No. 413, X000617513 (7 pp.).

* cited by examiner

FIG. 9 ved. A decoded signal may be subtracted from a first delayed signal and an error signal may be generated. The error signal may be squared and a square of a first error signal and a square of a second error signal may be averaged and a mean value may be output. A signal, which may be inversely proportional to the error signal, may be generated, based on the mean value.

CHANNEL STATE DETERMINATION METHOD AND CHANNEL STATE GENERATOR IN RECEIVER

This application claims the priority of Korean Patent Application No. 2004-0034268, filed on May 14, 2004, in the Korean Intellectual Property Office, the disclosure of which is incorporated herein in its entirety by reference

BACKGROUND OF THE INVENTION

1. Field of the Invention

Exemplary embodiments of the present invention relate to a receiver, a generator, an error-averager, and a determiner, and methods for the same.

2. Description of the Conventional Art

Viewers may buy television receivers, which may have digital television (DTV) receivers and/or digital set-top boxes to view images provided by digital broadcasting.

Conventional analog broadcasting signals may include, for example, national television system committee (NTSC) signals, phase alternation by line system (PAL) signals, and sequential couleur a memoire (SECAM) signals. DTV signals may include 8-level vestigial side band (VSB) signals, which may be defined by, for example, the advanced television system committee (ATSC). Receivers, which may have DTV receivers and digital set-top boxes may process analog and digital broadcasting signals. Digital set-top boxes alone may not receive analog broadcasting signals.

Signals, for example, DTV broadcasting signals, satellite broadcasting signals, cable TV broadcasting signals, and wireless local area network (WLAN) signals may be used for broadcasting and it may be difficult to allocate other broadcast frequency bands. Analog and digital broadcasting signals may be allocated to a co-channel, for example, an ultra high frequency (UHF) channel or a very high frequency (VHF) channel and transmitted through the co-channel. If an analog broadcasting signal, for example, an NTSC signal and a digital broadcasting signal exist in a co-channel, when an analog television receiver demodulates an analog broadcasting signal into a display signal, the digital broadcasting signal may act as a smaller noise component, and the analog broadcasting signal may be received. When a DTV receiver demodulates a digital broadcasting signal to a display signal, the level of co-channel interference with an NTSC signal may be higher and the digital broadcasting signal may not be received.

Figure 1:
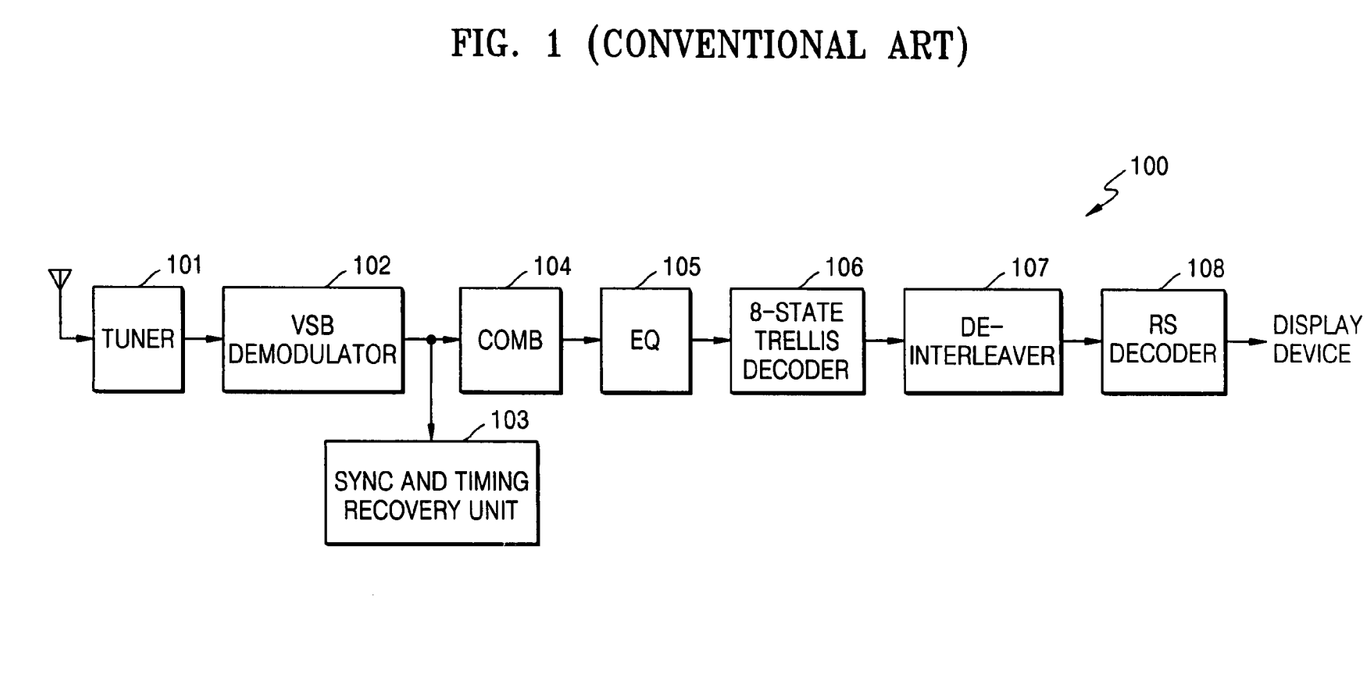
FIG. 1 is a block diagram of a conventional digital television (DTV) receiver.

FIG. 1 is a block diagram of a conventional digital (e.g., DTV) receiver 100. Referring to FIG. 1, the DTV receiver 100 may include a tuner 101, a VSB demodulator 102, a sync and timing recovery unit 103, a 12 symbol delay comb filter 104, which may remove an NTSC signal, an equalizer 105, an 8-state trellis decoder 106, a de-interleaver 107, and a Reed-Solomon (RS) decoder 108. In the output of the 12 symbol delay comb-filter 104, deep spectral nulls may be introduced at the locations of video, chroma, and audio carriers of, for example, an NTSC signal. The power of the NTSC signal, which may pass through the 12 symbol delay comb-filter 104, may be reduced (e.g., significantly reduced). A VSB signal, which may pass through the 12 symbol comb-filter 104, may be output as a 15-level constellation, and the 8-state trellis decoder 106 may detect the 15-level constellation. The DTV receiver 100, which may cancel co-channel (e.g., NTSC co-channel) interference may improve performance when a signal-to-noise ratio (SNR) of a received signal may be greater than, for example, 20 dB. When the SNR of the received signal is less than 19 dB, the performance of the DTV receiver 100 may degrade (e.g., significantly degrade). The DTV receiver 100 may use a switching scheme for detecting and removing, for example, the NTSC signal.

Figure 2:
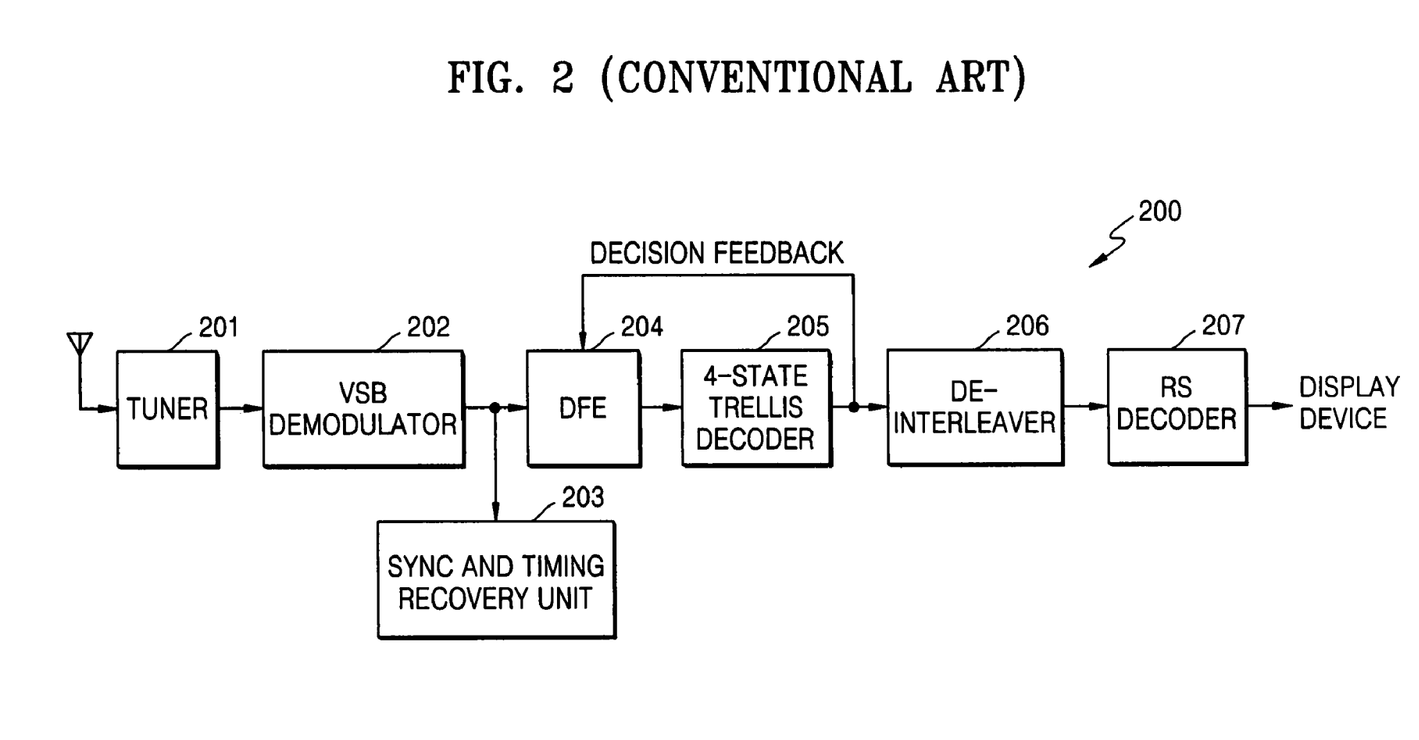
FIG. 2 is a block diagram of another conventional DTV receiver.

FIG. 2 is a block diagram of another conventional DTV receiver 200. Referring to FIG. 2, the DTV receiver 200 may include a tuner 201, a VSB demodulator 202, a sync and timing recovery unit 203, a decision feedback equalizer (DFE) 204, a 4-state trellis decoder 205, a de-interleaver 206, and an RS decoder 207. An output of the 4-state trellis decoder 205, a trellis-coded modulation (TCM) decoder, may feed back to the DFE 204 and the DFE 204 may equalize spectral nulls. The performance of the DFE 204 may not degrade in the additive white Gaussian noise (AWGN) channel and the DFE 204 need not detect and remove the NTSC signal using a switching scheme. The DTV receiver 200 may reduce NTSC co-channel interference using the DFE 204. The DFE 204 may partially equalize co-channel interference due to, for example, time-varying characteristics of the NTSC signal. Noise, which may be caused by co-channel interference, may need to be removed from an output signal of the DFE 204. Noise may be at rising and/or falling edges of an NTSC line synchronous signal. The NTSC line synchronous signal may be a clock signal, which may have an NTSC horizontal scan rate. According to, for example, the Advanced Television System Committee High Definition Television (ATSC-HDTV) standard, the cycle of the NTSC line synchronous signal may be equal, or substantially equal, to 684 symbols of an 8-VSB signal.

SUMMARY OF THE INVENTION

Exemplary embodiments of the present invention relate to a receiver, which may include a generator, an error-averager, and a reliability determiner therein, and methods for the same.

In an exemplary embodiment of the present invention, a generator may include a slicer, a subtractor, a squarer, an error-averager, and an inverter. The slicer may quantize an input signal. The subtractor may subtract the quantized signal from the input signal and may generate an error signal. The squarer may square the error signal and the error-averager may average a square of a first error signal and a square of a second error signal and output a mean value. The inverter may generate a signal, which may inversely proportional to the error signal, based on the mean value.

In another exemplary embodiment of the present invention, a generator may include a first delayer, a subtractor, a squarer, an error-averager, and an inverter. The first delayer may delay an input signal by a first delay time and may generate a first delayed signal. The subtractor may subtract a decoded signal from the first delayed signal and may generate an error signal. The squarer may square the error signal and the error-averager may average a square of a first error signal and a square of a second error signal and may output a mean value. The inverter may generate a signal, which may be inversely proportional to the error signal, based on the mean value.

In another exemplary embodiment of the present invention, a receiver may include an equalizer, a generator, and a decoder. The equalizer may equalize interference of an input signal using a decoded signal and may generate an equalized signal. The generator may generate an information signal based on the equalized signal, which may be proportional to a reliability of a symbol that changes based on a degree of interference. The decoder may decode using the equalized signal and the information signal and may generate the decoded signal.

In another exemplary embodiment of the present invention, a method of determining a channel state for a signal is provided. The method may include quantizing an input signal, subtracting the quantized signal from the input signal and generating an error signal, squaring the error signal, averaging a square of a first error signal and a square of a second error signal and outputting a mean value, and generating an information signal, which may be inversely proportional to the error signal, based on the mean value.

In another exemplary embodiment of the present invention, a method of determining a channel state for a signal is provided. The exemplary embodiment of the method may include delaying an input signal by a first delay time and generating a first delayed signal, subtracting a decoded signal from the first delayed signal and generating an error signal, calculating a square of the error signal, averaging a square of a first error signal and a square of a second error signal and outputting a mean value, and generating an information signal, which may be inversely proportional to the error signal, based on the mean value.

In another exemplary embodiment of the present invention, a method for receiving a signal is provided. The exemplary embodiment of the method may include equalizing interference of an input signal using a decoded signal and generating an equalized signal, generating from the equalized signal an information signal, which may be proportional to the reliability of a symbol that changes based on a degree of interference, and decoding, using the equalized signal and the information signal, and generating the decoded signal.

In exemplary embodiments of the present invention, the error-averager may further include a first multiplier, an adder, a delayer, and a second multiplier.

In exemplary embodiments of the present invention, the error-averager may further include a second delayer.

In exemplary embodiments of the present invention, the sum of the first coefficient and the second coefficient may be 1 and the sum of the first delay time and the second delay time may be equal to the scan cycle.

In exemplary embodiments of the present invention, the generator may quantize the equalized signal to a level, may subtract a quantized signal from the equalized signal, may generate an error signal, may average a square of a first error signal and a square of the error signal, and may generate an information signal, which may be inversely proportional to the error signal, based on the mean value.

In exemplary embodiments of the present invention, the receiver may further include a determiner, which may generate a second error signal using the information signal and the equalized signal, and the equalizer may equalize interference of the input signal using the decoded signal and the second error signal and may generate the equalized signal.

In exemplary embodiments of the present invention, the averaging may further include, multiplying the square of the first error signal by a first coefficient and outputting a first multiplied value, adding the first multiplied value and a second multiplied value and outputting a sum as the mean value, delaying the sum by the scan cycle and generating a delayed signal, and multiplying the delayed signal by a second coefficient and outputting the second multiplied value.

In exemplary embodiments of the present invention, the averaging may further include, multiplying the square of the first error signal by a first coefficient and outputting a first multiplied value, adding the first multiplied value and a second multiplied value and outputting a sum, delaying the sum by a second delay time and outputting a delayed value as the mean value, delaying the value delayed by the second delay time by the first delay time and generating a second delayed signal, and multiplying the second delayed signal by a second coefficient and outputting the second multiplied value.

In exemplary embodiments of the present invention, the generating of an information signal may further include, quantizing the equalized signal, subtracting an quantized signal from the input signal and generating an error signal, averaging a square of a first error signal and a square of a second error signal and outputting a mean value, and generating an information signal, which is inversely proportional to the error signal, based on the mean value.

In exemplary embodiments of the present invention, the generating of an information signal may further include, generating the error signal using the equalized signal and the decoded signal, averaging a square of a first error signal and a square of a second error signal and outputting a mean value, and generating an information signal, which is inversely proportional to the error signal, based on the mean value.

BRIEF DESCRIPTION OF THE DRAWINGS

The present invention will become more apparent by describing in detail exemplary embodiments thereof with reference to the attached drawings in which.

DETAILED DESCRIPTION OF THE EXEMPLARY EMBODIMENTS OF THE PRESENT INVENTION

The present invention will now be described more fully with reference to the accompanying drawings, in which exemplary embodiment of the invention are shown. The present invention may, however, be embodied in many different forms and should not be construed as being limited to the embodiments set forth therein; rather, these exemplary embodiments are provided so that this disclosure will be thorough and complete, and will fully convey the concept of the invention to those skilled in the art. Like reference numerals in the drawings denote like elements, and thus their description will be omitted.

Figure 3:
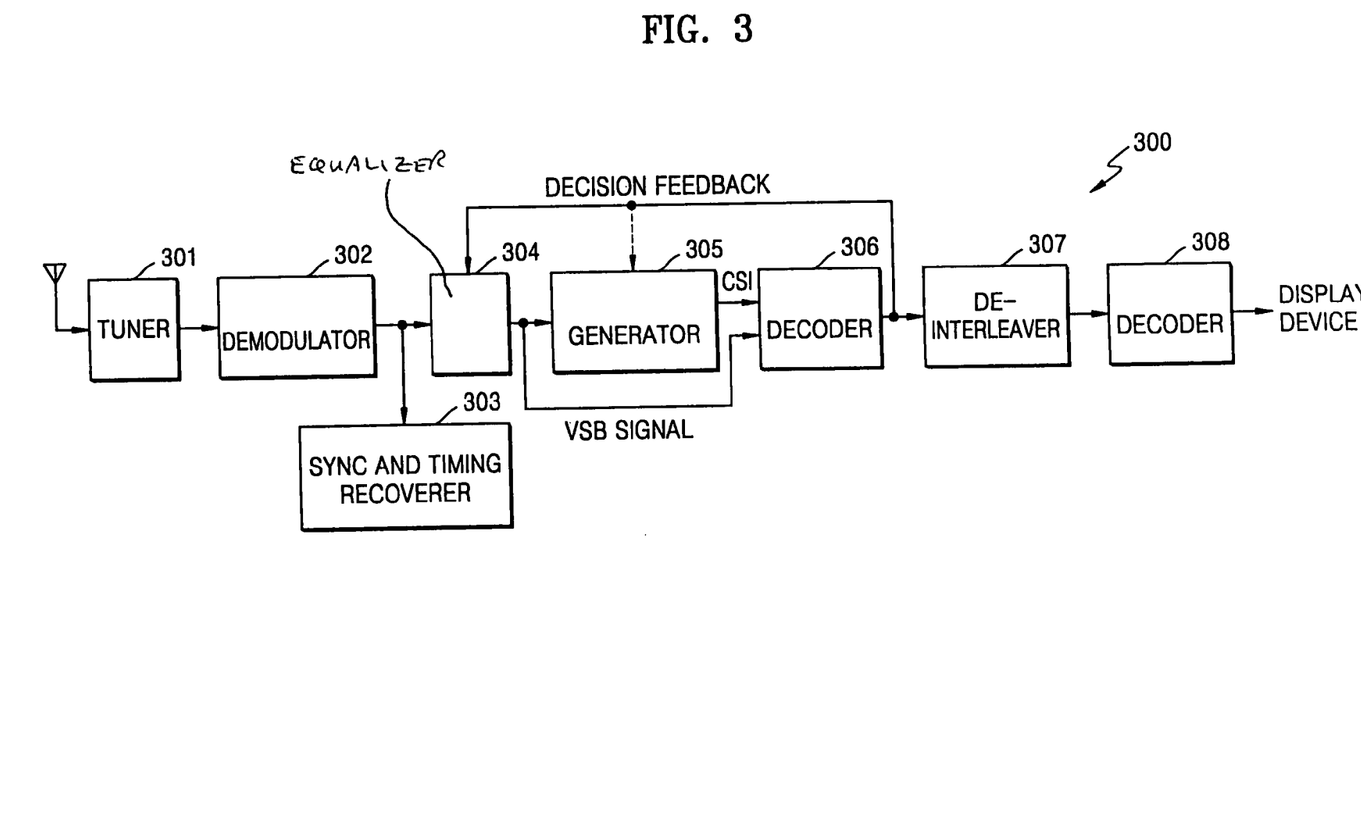
FIG. 3 is a block diagram of a receiver including a generator according to an exemplary embodiment of the present invention.

FIG. 3 is a block diagram of an exemplary embodiment of a receiver (e.g., a digital television receiver (DTV)) 300. Referring to FIG. 3, the receiver 300 may include a tuner 301, a demodulator (e.g., a VSB demodulator) 302, a sync and timing recoverer 303, an equalizer (e.g., a decision feedback equalizer (DFE)) 304, a generator (e.g., a channel state generator) 305, a decoder (e.g., a 4-state trellis decoder) 306, a de-interleaver 307, and a decoder (e.g., a Reed-Solomon radio frequency (RF) decoder) 308.

The tuner 301 may receive a wave (e.g., a ground wave), which may include an analog signal (e.g., analog broadcasting signal), for example, an NTSC signal, and a digital signal (e.g., digital broadcasting signal), for example, an 8-VSB signal, allotted to a co-channel. The tuner 301 may convert the wave into a base band signal and/or a digital signal, and may output a stream (e.g., a digital stream). Using, for example, binary phase shift keying (BPSK), quadrature phase shift keying (QPSK), and quadrature amplitude modulation (QAM), the demodulator 302 may modulate the stream output from the tuner 301 and may output a complex (e.g., I and Q signals) stream (e.g., a complex VSB symbol stream). The sync and timing recoverer 303 may extract signals (e.g., synchronous signals), for example, horizontal and/or vertical synchronous signals for television (e.g., digital television (DTV)), and carrier and symbol time information of a symbol (e.g., a VSB symbol). The signals and the carrier and symbol time information may be used (e.g., as reference signals) for signal processing by the receiver 300.

The equalizer 304 may equalize interference (e.g., inter-symbol interference (ISI)) of an input signal (e.g., VSB signal) using a decoded (e.g., a trellis-decoded) signal, which may be output from a decoder (e.g., a 4-state trellis decoder) 306, and may generate an equalized signal (e,g., an equalized VSB signal). The equalizer 304 may update equalizer coefficients using the decoded signal and may generate an equalized signal using an algorithm, for example, a least mean square algorithm.

The generator 305 may generate an information (e.g., a channel state information (CSI)) signal from the equalized signal. The information signal may contain information regarding reliability of a symbol, for example, how much the equalized signal may have been affected by co-channel interference, for example, NTSC co-channel interference. The information signal (e.g., a CSI signal) may be proportional to the reliability of the present symbol. The generator 305, according to exemplary embodiments of the present invention, may improve decoding by the decoder 306 and the de-interleaver 307.

The decoder 306 may decode the input signal (e.g., a VSB signal) using the information signal and may output a stream (e.g., a bit-stream), which may have a lower symbol error rate (SER) due to, for example, co-channel interference (e.g., NTSC co-channel interference). The decoder 306 and the de-interleaver 307 may decode the input signal, using the information signal, and may output a signal, which may have a higher signal-to-noise ratio (SNR). If the present symbol is affected by the co-channel interference, the value of the information signal may be reduced. If the affect on the present VSB symbol, by the co-channel interference, is reduced, the value of the information signal may increase.

Co-channel interference (e.g., NTSC co-channel interference) at the output of equalizer 304 may occur at rising and/or falling edges of a signal (e.g., an NTSC line synchronous signal). The signal may be a clock signal with, for example, a horizontal scan rate (e.g., an NTSC horizontal scan rate) and may have a frequency of, for example, 15.75 kHz. According to, for example, the ATSC-HDTV standard, the cycle of the signal may be equal, or substantially equal, for example, to 684 symbols of an 8-VSB signal.

An exemplary embodiment of the generator 305 will be described with reference to FIG. 4. The generator 305 may generate the information signal from the equalized signal, using the decoded signal output from the decoder 306.

The decoder (e.g., 4-state trellis decoder) 306 may generate a decoded signal (e.g., trellis coded modulation (TCM) decoded signal) using the equalized signal output from the equalizer 304 and the information signal output from the generator 305. The decoded signal may be input to the equalizer 304 and the de-interleaver 307.

The generating of a decoded signal may include calculating a metric (e.g., a branch metric) for de-mapping using an algorithm (e.g., a Viterbi algorithm) according to a modulation scheme, for example, BPSK, QPSK, and QAM. The decoder 306 may calculate another metric (e.g., another branch metric) using the information signal, as shown in Equation 1. In Equation 1, $BM_K^{(NEW)}$ may denote another metric value of a receiver (e.g., a digital television (DTV) receiver) according to an exemplary embodiment of the present invention, and $BM_K$ may denote a metric value (e.g., a branch metric value) of a conventional receiver as shown in FIG. 1 or 2. $CSI_K$ may denote an information signal (e.g., a CSI signal), which may be output from the generator 305, and k may denote an index (e.g., a VSB symbol index).

$$BM_K^{(NEW)}=CSI_K*BM_K \quad (1)$$

The de-interleaver 307 may de-interleave the decoded signal, which may be output from the decoder 306, according to an algorithm. The decoder (e.g., an Reed-Solomon decoder) 308 may correct errors in the de-interleaved signal according to an algorithm (e.g., a Reed-Solomon algorithm) and may output a corrected error signal. A signal processor may generate a signal, for example, a line synchronous signal, a vertical synchronous signal, an image signal, and/or an audio signal for an audio and/or visual display using the error corrected signal output from the decoder 308, and may output the signal to a display device (e.g., a liquid crystal display (LCD)).

Figure 4:
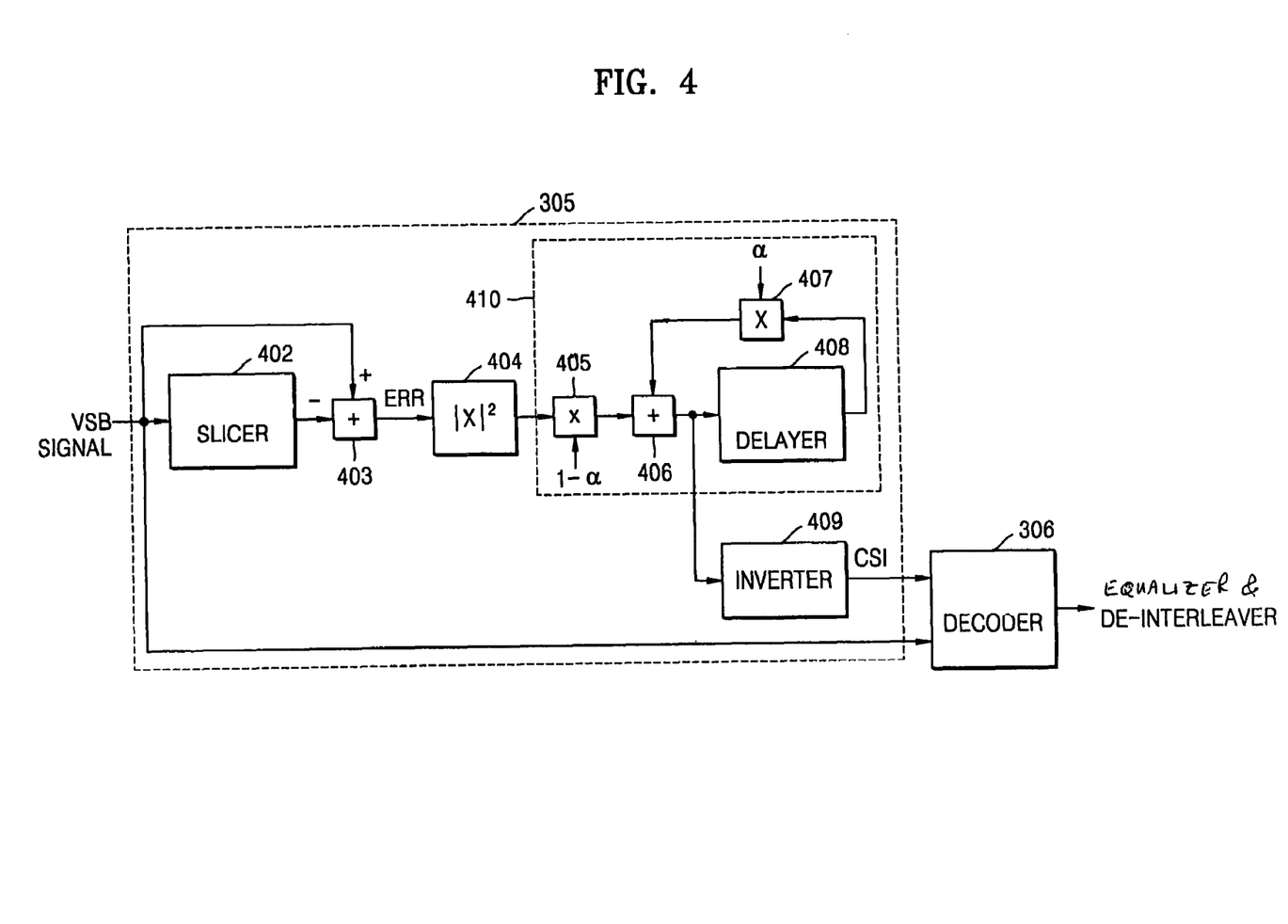
FIG. 4 is a block diagram of the generator of FIG. 3 according to an exemplary embodiment of the present invention.

FIG. 4 is a block diagram illustrating an exemplary embodiment of the generator 305 of FIG. 3. Referring to FIG. 4, the generator circuit 305 may include a slicer (e.g., an 8-level slicer) 402, a subtractor 403, a squarer 404, an error-averager 410, and an inverter 409. The error-averager 410 may include a multiplier 405, an adder 406, a delayer (e.g., a 684-symbol delayer) 408, and a multiplier 407.

The slicer 402 may quantize the input signal (e.g., a VSB input signal) output from the equalizer 304 of FIG. 3 to any one of a plurality of levels. For example, the level of the quantized signal may be any one of −7, −5, −3, −1, 0, +1, +3, +5, and +7. The subtractor 403 may subtract the quantized signal from the input signal output from the equalizer 304 and may generate an error signal ERR. The squarer 404 may calculate the square of the error signal ERR, which may indicate the reliability of the symbol (e.g., the VSB symbol).

The error-averager 410 may average the square of the present error signal ERR and the error signal ERR prior to a scan cycle (e.g., an NTSC horizontal scan cycle), and may output a mean value. The multiplier 405, which may be included in the error-averager 410, may multiply the square of the present error signal ERR by a coefficient 1-α. The adder 406 may add an output value of the multiplier 405 and an output of the multiplier 407, and may output the sum as a mean value of the squares of the error signal ERR. The delayer 408 may delay an output value of the adder 406 by the scan cycle (e.g., a 684 symbol period) and may output a delayed signal. The multiplier 407 may multiply the delayed signal by a coefficient α. Co-channel interference may occur at the rising and falling edges of the line synchronous signal and the mean value of the squares of the error signal ERR output from the adder 406 may have peaks in, for example, each horizontal scan cycle.

Figure 7:
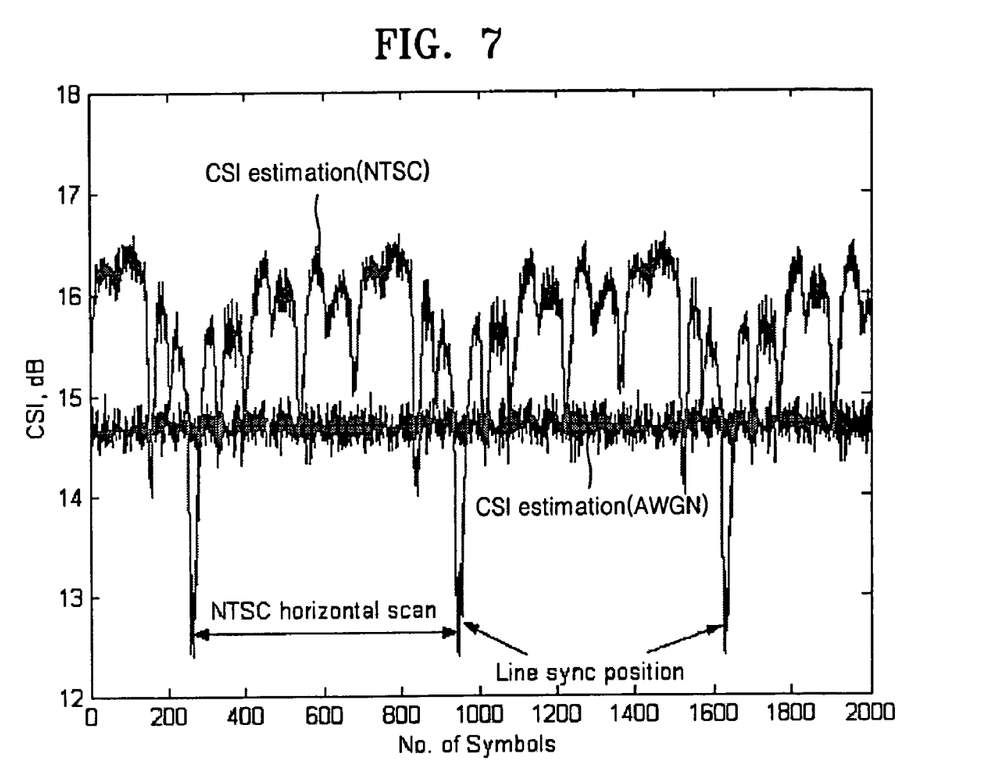
FIG. 7 is an example of a waveform of an information (e.g., a channel state information (CSI)) signal in a channel, which may include co-channel interference (e.g., NTSC co-channel interference) and in a noise (e.g., an additive white Gaussian noise (AWGN)) channel according to exemplary embodiments of the present invention.

Referring to FIG. 4, α may be 1-(1/1024), and the sum of the coefficients 1−α and α may be 1. As a becomes closer to 1, system performance may improve. The multiplier 405 and the multiplier 407 may be implemented as digital adders and/or shift registers. The inverter 409 may generate an information signal (e.g., a CSI signal), which may be inversely proportional to the error signal ERR. Using, for example, a read only memory (ROM) table, the inverter 409 may generate a value of an information signal, which may be inversely proportional to the mean value. Although the mean value may indicate the reliability of the symbol (e.g., the VSB symbol), the mean value may be an average of squared values of the error signal ERR. The inverter 409 may invert the mean value and may generate a value of the information signal, which may be proportional to the reliability. The mean value output from the adder 406 may have peaks in, for example, each scan cycle (e.g., NTSC horizontal scan cycle). The information signal may have peaks as shown in FIG. 7. When the present symbol is affected by, for example, interference of the line synchronous signal, the error signal ERR may have increased average power, and the value of the information signal (e.g., the value of the CSI signal) of the present symbol may be reduced. When the present symbol is not affected by, for example, interference of the line synchronous signal, the error signal ERR may have a reduced average power, and the value of the information signal of the present symbol may be increased.

As described above, exemplary embodiments of the generator 305 may quantize an equalized signal output from the equalizer 304 to a level, subtract the quantized signal from the equalized signal, and generate an error signal ERR. The generator 305 may average the square of the error signal ERR and the square of the error signal ERR before a scan cycle and may generate an information signal (e,g, a CSI signal), which may be inversely proportional to the error signal ERR.

Figure 5:
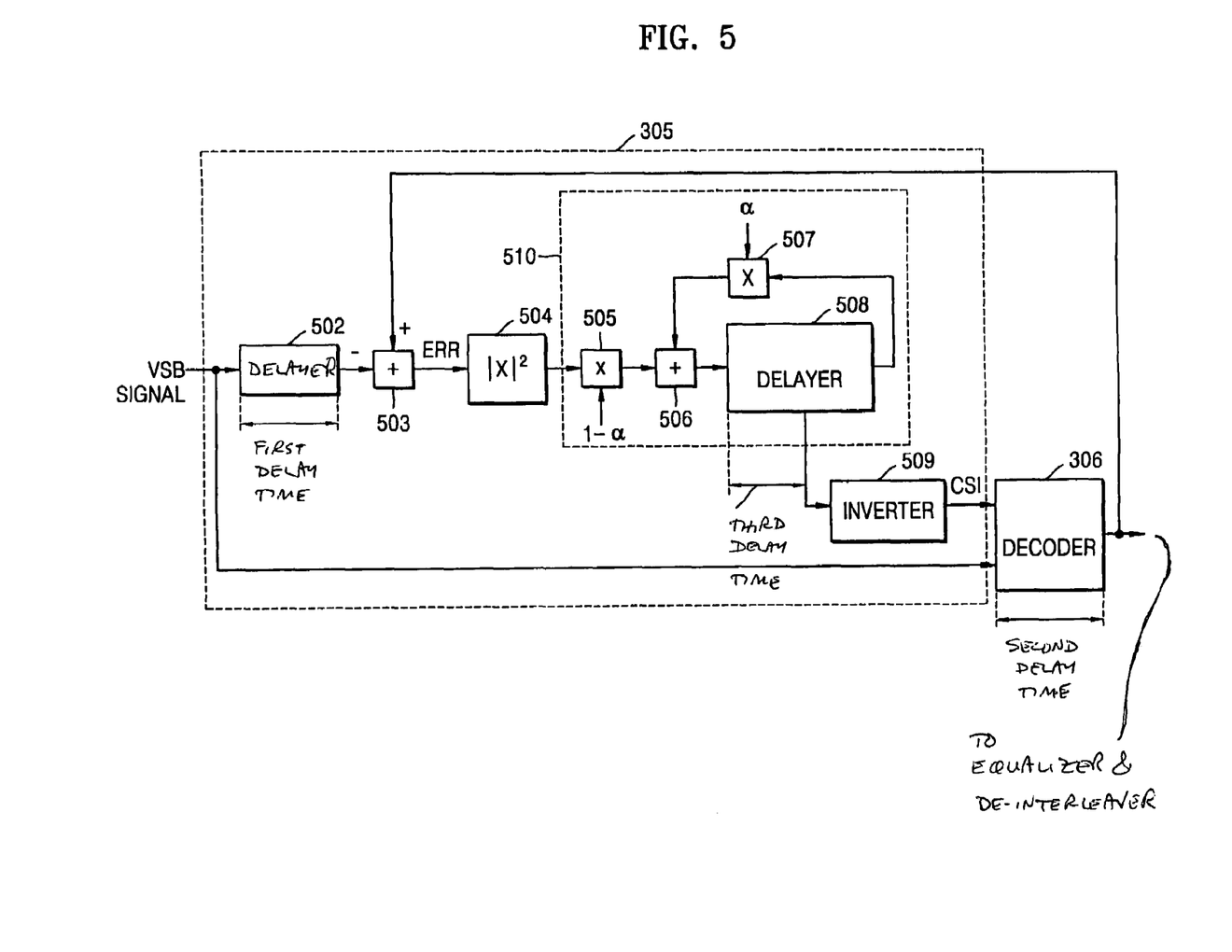
FIG. 5 is a block diagram of generator according to another exemplary embodiment of the present invention.

FIG. 5 is a block diagram of another exemplary embodiment of the generator 305. Referring to FIG. 5, the generator 305 may include a delayer 502, a subtractor 503, a squarer 504, an error-averager 510, and an inverter 509. The error-averager 510 may include a multiplier 505, an adder 506, a delayer 508 (e.g., a 684-symbol delayer), and a multiplier 507. An output of a decoder (e.g., a 4-state trellis decoder) 306 may be used to generate an error signal ERR. A signal decoded by the decoder 306 may be more reliable than an output of the slicer 402, and system performance may be improved.

The delayer 502 may delay an equalized input signal (e.g., an equalized VSB signal) output from the equalizer 304 by a first delay time (e.g., delay time $D_{trellis}$) and may output a delayed signal. The first delay time may be equal to a second delay time for the decoder 306 to decode (e.g., trellis-decode) the equalized signal (e.g., the equalized VSB signal) using the information signal (e.g., the CSI signal). The decoded signal may be input to the subtractor 503. The subtractor 503 may subtract the decoded signal from the delayed signal and may generate an error signal ERR. The squarer 504 may calculate the square of the error signal ERR.

As described with reference to FIG. 4, the error-averager 510 may average the square of a present error signal ERR and that of an error signal ERR before a scan cycle (e.g., the NTSC horizontal scan cycle), and may generate a mean value.

The multiplier 505, which may be included in the error-averager 510, may multiply the square of the present error signal ERR by a coefficient 1−α. The adder 506 may add an output value of the multiplier 505 and the output of the multiplier 507, and may output the sum. Similar to the delayer 408 of FIG. 4, the delayer 508 may delay an output value of the adder 506 by a third delay time (e.g., 684 symbol period—$D_{trellis}$) and may output a value as a mean value of the squares of the error signal ERR. The delayer 508 may further delay the output value by a fourth delay time (e.g., $D_{trellis}$), and may output another delayed signal. The output value of the adder 506 may be delayed by the third delay time (e.g., 684 symbol period—$D_{trellis}$) and may synchronize the equalized signal output from the equalizer 304 with the information signal (e.g., the CSI signal), such that they may be input to the decoder 306. The multiplier 507 may multiply the delayed signal by a coefficient α. The delayed signal may be output from the adder 506 and delayed by the scan cycle (e.g., delayed by a 684 symbol period). Co-channel interference may occur at the rising and falling edges of, for example, the line synchronous signal and a mean value delayed by the third delay time (e.g., 684 symbol period—$D_{trellis}$), may have peaks, for example, in each scan cycle. Similar to that as discussed above with regard to FIG. 4, the sum of the coefficient 1−α and the coefficient α input to the multiplier 505 and the multiplier 507 may be 1, and α may be, for example, 1-(1/1024)

The inverter 509 may generate an information signal (e.g., a CSI signal), which may be inversely proportional to the error signal ERR. The inverter 509 may invert the mean value and generate a value of the information signal, which may be proportional to the reliability of a symbol. The mean value output from the delayer 508 may have peaks in, for example, each scan cycle (e.g., NTSC horizontal scan cycle). For example, The information signal (e.g., the CSI signal) may have peaks as shown in FIG. 7.

As described above, the generator 305 of FIG. 5 may generate an information signal using the equalized signal and the decoded signal. The generator 305 may average the square of the error signal ERR and the square of the error signal ERR before a scan cycle, and may generate the an information signal, which may be inversely proportional to the error signal ERR.

Figure 6:
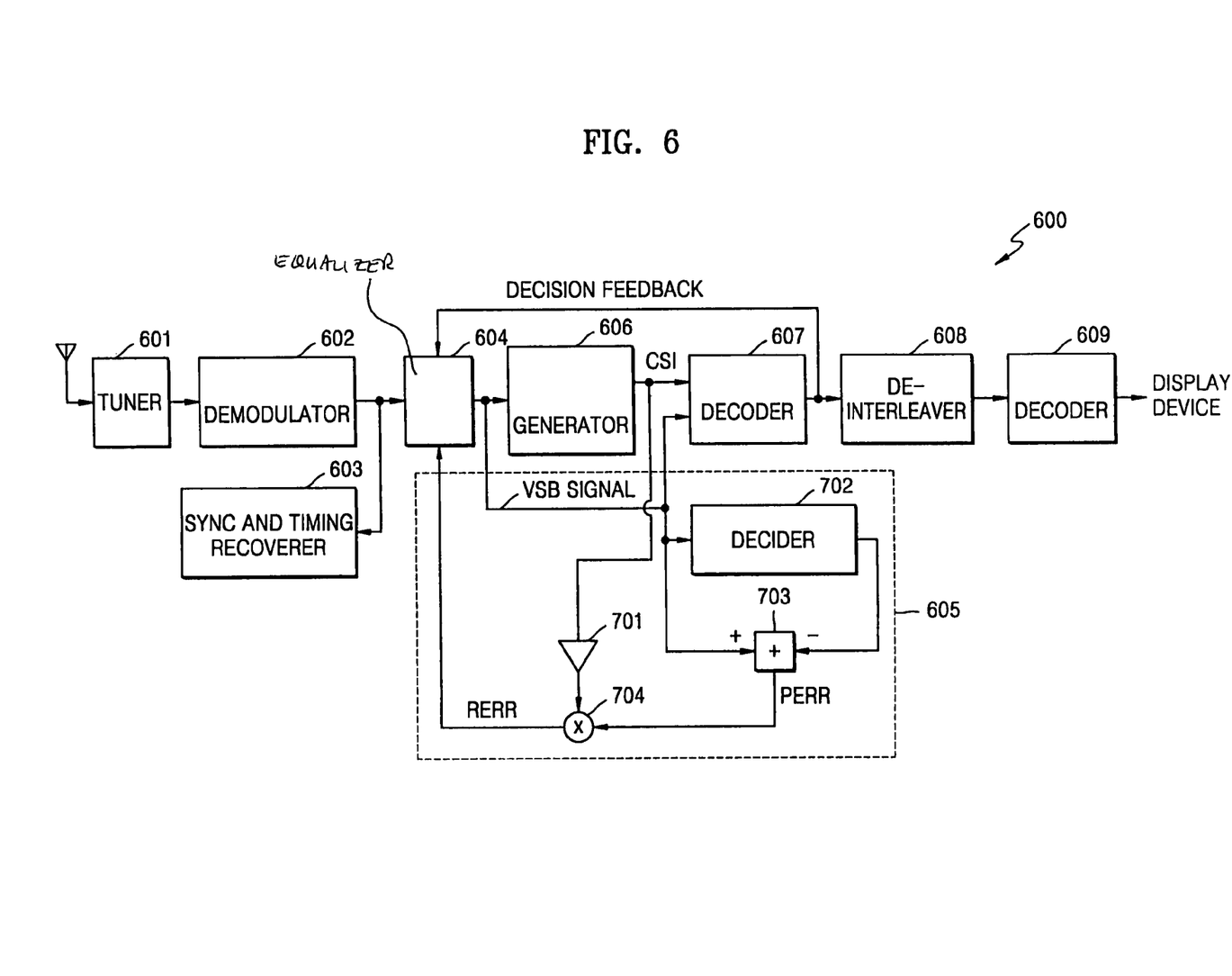
FIG. 6 is a block diagram of a receiver according to another exemplary embodiment of the present invention.

FIG. 6 is a block diagram of another exemplary embodiment of the receiver (e.g., a digital television (DTV) receiver). Referring to FIG. 6, the receiver 600 may include a tuner 601, a demodulator (e.g., a VSB demodulator) 602, a sync and timing recoverer 603, an equalizer (e.g., a decision feedback equalizer (DFE)) 604, a reliability determiner 605, a generator (e.g., a channel state generator) 606, a decoder (e.g., a 4-state trellis decoder) 607, a de-interleaver 608, and a decoder (e.g., a Reed-Solomon (RS) decoder) 609. The receiver 600 may be the same, or substantially the same, as the receiver 300 of FIG. 3. The receiver 600 may further include the reliability determiner 605. The operations of the elements included in the receiver 600 may be the same, or substantially the same, as the elements of the receiver 300 of FIG. 3. However, the reliability determiner 605 may be added and the equalizer 504 may operate differently, or substantially differently, due to the reliability determiner 605. The reliability determiner 605 and the equalizer 604 will be described.

The receiver 600 may reduce the likelihood of the equalizer 604 updating equalizer coefficients during, for example, rising and falling edge periods of the line synchronous signal (e.g., NTSC line synchronous signal) when co-channel interference may occur. If the equalizer 604 updates the equalizer coefficients during the rising and falling edge periods of the line synchronous signal, probability of an error and/or quantity of errors may increase. The reliability determiner 605 may generate an error signal RERR using a information signal (e.g., a CSI signal), which may be output from the generator 606, and an equalized signal (e.g., an equalized VSB signal), which may be output from the equalizer 604. The equalizer 604 may equalize interference (e.g., inter-symbol interference (ISI)) of a signal (e.g., a VSB signal) corresponding to a symbol (e.g., a present symbol), which may be output from the demodulator (e.g., a VSB demodulator) 602 and may generate an equalized signal corresponding to another symbol (e.g., a next symbol). The equalizer 604 may update equalizer coefficients using the output of the decoder 607 and the error signal RERR, and may generate the equalized signal.

The reliability determiner 605 may include a scaler 701, a decider 702, a subtractor 703, and a multiplier 704. The decider 702 may quantize the equalized signal output from the equalizer 604 to any one of a plurality of levels. The decider 702 may output a quantized signal to a level of, for example, −7, −5, −3, −1, 0, +1, +3, +5, and +7. The subtractor 703 may subtract the quantized signal from the equalized signal. The multiplier 704 may multiply an error signal PERR, which may be output by the subtractor 703, by a signal, which may be output by the scaler 701, and may generate the multiplied signal as the refined error signal RERR. The scaler 701 may scale the information signal (e.g., a CSI signal) at a level and may output the scaled signal at one of a plurality of levels. The scaler 701 may be implemented as a quantizer (e.g., a 2-level (0/1) quantizer). For example, when the information (e.g., CSI) signal is smaller than a critical value, the value of the refined error signal RERR may be 0. When the information (e.g., CSI) signal is greater than a critical value, the value of the refined error signal RERR may be 1.

The reliability determiner 605 may generate the refined error signal RERR, and the equalizer 604 may determine a number of equalizer coefficients, which may be updated according to the size of the error signal RERR. For example, during the rising and falling edge periods of the line synchronous signal (e.g., the NTSC line synchronous signal), the information (CSI) signal and the refined error signal RERR may be reduced. The equalizer 604 may reduce the number of affected equalizer coefficients. For example, the equalizer may reduce the number of equalizer coefficients, which may or may not be updated.

Figure 8:
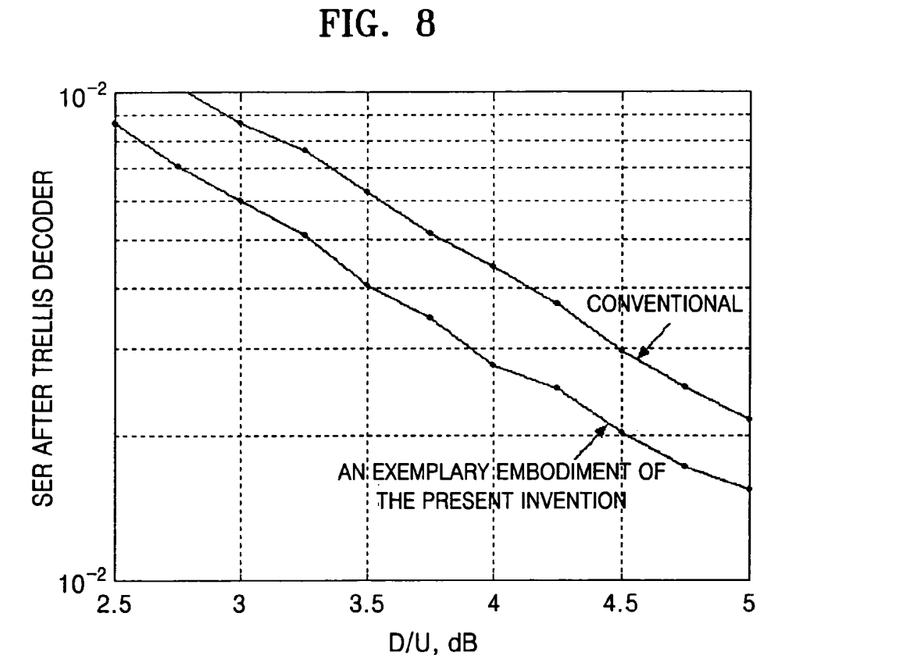
FIG. 8 is a graph comparing examples of symbol error rates (SERs) of a conventional DTV receiver and the receiver according to exemplary embodiments of the present invention in the channel having co-channel interference (e.g., NTSC co-channel interference)

FIG. 7 is an example of a waveform of an information (e.g., a CSI) signal in a channel, which may have interference (e.g., NTSC co-channel interference) and in a noise (e.g., an additive white Gaussian noise (AWGN)) channel. Referring to FIG. 7, within the channel, co-channel interference may occur at the rising and falling edges of the synchronous signal (e.g., NTSC line synchronous signal) and the information signal may have lower-level peaks in, for example, each scan cycle (e.g., NTSC horizontal scan cycle). In the noise channel, the information signal may have lower levels, for example, the information signal may have a constant lower level. FIG. 8 is an example of a graph comparing symbol error rates (SERs) of a conventional receiver and the receiver according to an exemplary embodiment of the present invention in a channel, which may have interference (e.g., NTSC co-channel interference). Referring to FIG. 8, when a received VSB signal is affected by interference (e.g., NTSC co-channel interference), the receiver may improve system performance by, for example, greater than 0.6 dB of SER. As known to one ordinary skill in the art, D/U refers to an energy ratio of a VSB signal (desired signal "D") to an NTSC signal (undesired signal "U").

Figure 9:
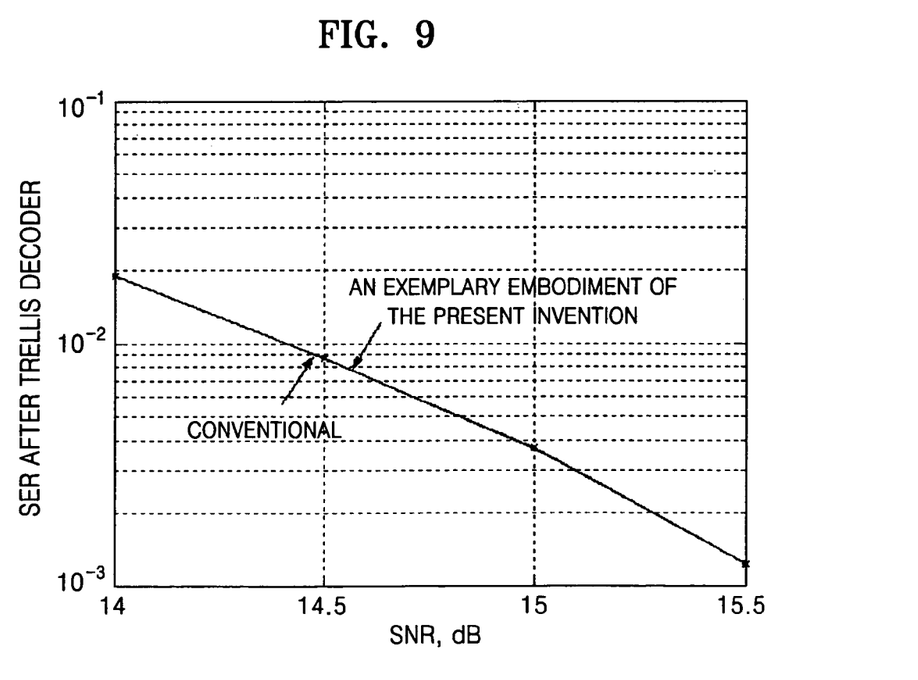
FIG. 9 is a graph comparing examples of SERs of the conventional DTV receiver and the receiver according to exemplary embodiments of the present invention in, for example, the AWGN channel.

FIG. 9 is an example of a graph comparing SERs of the conventional receiver and a receiver according to an exemplary embodiment of the present invention in the noise (e.g., AWGN) channel.

As described above, exemplary embodiments of the receivers 300 and 600 may include generators 305 and 606, which may generate information signals (e.g., CSI signals) from outputs of equalizers 304 and 604, and may transmit the information signals to decoders (e.g., trellis decoders) 306 and 607, which may calculate metrics (e.g., branch metrics). The generators 305 and 606 may generate error signals ERRs from outputs of the equalizers 304 and 604 and quantized and/or decoded (e.g., trellis decoded) signals. The generators 305 and 606 may average squares of a present error signal ERR and an error signal ERR before, for example, 684 symbols (i.e., a scan cycle), and may output a value, which may be inversely proportional to the averaged signal, as an information signal. The information signal may be proportional to the reliability of the present symbol (e.g., 8-VSB symbol) being processed. When the present symbol is affected by a synchronous signal, the error signal ERR may have a greater average power, and the value of the information signal of the present symbol may be reduced. When the present symbol is not affected by the synchronous signal, the error signal ERR may have reduced average power, and the value of the information signal of the present symbol may be increased. Exemplary embodiments of the receivers 300 and 600 may use, for example, cyclical characteristics of the signal (e.g., an NTSC signal) to obtain an improved signal-to-noise ratio (SNR).

As described above, exemplary embodiments of the receiver (e.g., a DTV receiver) may improve system performance by, for example, at least 0.6 dB of SER when a received signal (e.g., a VSB signal) is affected by interference (e.g., NTSC co-channel interference). Exemplary embodiments of the receiver may not degrade performance in the noise (e.g., AWGN) channel.

Although exemplary embodiments of the present invention have been described with regard to video systems, it will be understood that exemplary embodiments of the present invention may also be utilized in any audio, video, and/or telecommunication systems.

Although exemplary embodiments of the present invention have been described as utilizing a least mean square algorithm for quantizing an input signal, it will be understood that any suitable quantizing algorithm may also be used.

Although exemplary embodiments of the present invention have been described with regard to display signals, for example, a line synchronous signal, a vertical synchronous signal, an image signal, and/or an audio signal for an audio and/or visual display using the error corrected signal output from the decoder 308, it will be understood that any suitable display and/or audio signals may also be utilized.

Although exemplary embodiments of the present invention have been described as modulating signals according to binary phase shift keying (BPSK), quadrature phase shift keying (QPSK), and quadrature amplitude modulation (QAM), it will be understood that any suitable modulation scheme may also be used.

Although exemplary embodiments of the present invention have been described with regard to the ATSC and the NTSC standards, it will be understood that any suitable standard may also be utilized.

Although exemplary embodiments of the present invention have been described as including multipliers, which may be implemented as digital adders and/or shift registers, it will be understood that any suitable multiplier may also be utilized.

Although exemplary embodiments of the present invention have been described with regard to trellis coded modulation (TCM) decoding, it will be understood that any suitable modulation scheme may also be utilized.

Although exemplary embodiments of the present invention have been described as including an inverter, which may be comprised of a read only memory (ROM) table, it will be understood that any suitable table may also be utilized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A channel state generator, comprising:
    a slicer adapted to quantize an input signal;
    a subtractor adapted to subtract the quantized signal from the input signal and to generate an error signal;
    a squarer adapted to calculate a square of the error signal;
    an error-averager adapted to average a square of a first error signal and a square of a second error signal, prior to a National Television System Committee (NTSC) horizontal scan cycle, and to output a mean value; and
    an inverter adapted to generate a signal, which is inversely proportional to the error signal, based on the mean value.

2. The generator of claim 1, wherein the error-averager includes:
    a first multiplier adapted to multiply the square of the first error signal by a first coefficient and to output a first multiplied value;
    an adder adapted to add the first multiplied value and a second multiplied value and to output a sum as the mean value;
    a delayer adapted to delay the sum by a scan cycle and to generate a delayed signal; and
    a second multiplier adapted to multiply the delayed signal by a second coefficient and to output the second multiplied value.

3. The generator of claim 2, wherein a sum of the first coefficient and the second coefficient is 1.

4. A receiver, comprising:
    an equalizer adapted to equalize interference of an input signal using a decoded signal and to generate an equalized signal;
    a generator adapted to generate an information signal based on the equalized signal, wherein the information signal is proportional to a reliability of a symbol that changes based on a degree of interference; and
    a decoder adapted to decode using the equalized signal and the information signal and to generate the decoded signal;
    wherein the generator quantizes the equalized signal to a level,
    wherein the generator subtracts the quantized signal from the equalized signal to generate an error signal,
    wherein the generator averages a square of a first error signal and a square of a second error signal, prior to a National Television System Committee (NTSC) horizontal scan cycle, to calculate a mean value, and
    wherein the generator generates an information signal, which is inversely proportional to the error signal, based on the mean value.

5. The receiver of claim 4, further including:
    a determiner adapted to generate a third error signal using the information signal and the equalized signal;
    wherein the equalizer equalizes interference of the input signal using the decoded signal and the third error signal.

6. The receiver of claim 5, wherein the determiner includes:
    a scaler adapted to scale the information signal at a level and to generate a scaled signal;
    a decider adapted to quantize the equalized signal to a level and to generate a quantized signal;
    a subtractor adapted to subtract the quantized signal from the equalized signal and to generate a subtracted signal; and
    a multiplier adapted to multiply the scaled signal by the subtracted signal and to generate a multiplied signal as the third error signal.

7. A method of determining a channel state for a signal, the method comprising:
    quantizing, in a quantizer, an input signal;
    subtracting, in a subtractor, the quantized signal from the input signal and generating an error signal;
    calculating, in a calculator, a square of the error signal;
    averaging, in an averager, a square of a first error signal and a square of a second error signal , prior to a National Television System Committee (NTSC) horizontal scan cycle, and outputting a mean value; and
    generating, in a generator, an information signal, which is inversely proportional to the error signal, based on the mean value.

8. The method of claim 7, wherein averaging a square of a first error signal and a square of a second error signal and outputting a mean value includes:
    multiplying, in a first multiplier, the square of the first error signal by a first coefficient and outputting a first multiplied value;
    adding, in an adder, the first multiplied value and a second multiplied value and outputting a sum as the mean value;
    delaying, in a delayer, the sum by a scan cycle and generating a delayed signal; and
    multiplying, in a second multiplier, the delayed signal by a second coefficient and outputting the second multiplied value.

9. The method of claim 8, wherein a sum of the first coefficient and the second coefficient is 1.

10. A method for receiving a signal, the method comprising:
    equalizing, in an equalizer, interference of an input signal using a decoded signal and generating an equalized signal;
    generating, in a generator, from the equalized signal an information signal, wherein the information signal is proportional to a reliability of a symbol that changes based on a degree of interference; and
    decoding, in a decoder, using the equalized signal and the information signal, and generating the decoded signal;
    wherein generating an information signal includes:
        quantizing, in a quantizer, the equalized signal;
        subtracting, in a subtractor, the quantized signal from the input signal and generating an error signal;
        averaging, in an averager, a square of a first error signal and a square of a second error signal, prior to a National Television System Committee (NTSC) horizontal scan cycle, and outputting a mean value; and
        generating, in the generator, the information signal.

11. The method of claim 10, further including:
generating, in a reliability determiner, a third error signal using the information signal and the equalized signal; and
generating, in the equalizer, the equalized signal using the decoded signal and the third error signal.

12. The method of claim 11, wherein generating the third error signal includes:
scaling, in a scaler, the information signal and generating a scaled signal;
quantizing, in the quantizer, the equalized signal and generating a quantized signal;
subtracting, in the subtractor, the quantized signal from the equalized signal and generating a subtracted signal; and
multiplying, in a multiplier, the scaled signal by the subtracted signal and generating a multiplied signal as the third error signal.

* * * * *